Nov. 20, 1923.
R. B. RHYNE
SPOON
Filed June 24, 1921
1,474,443
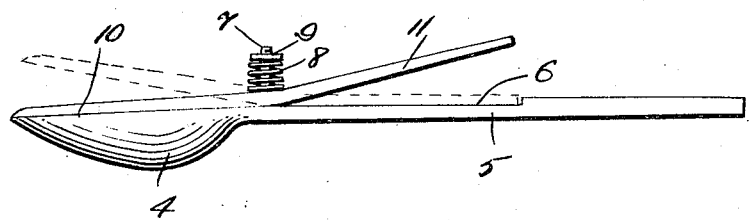
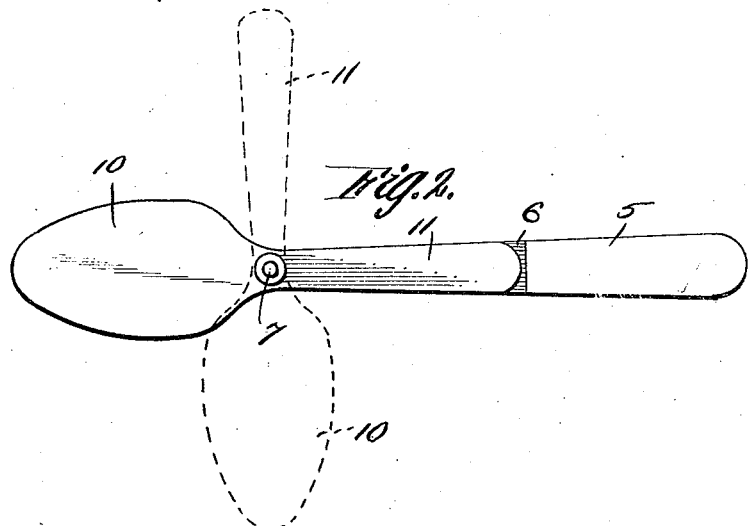
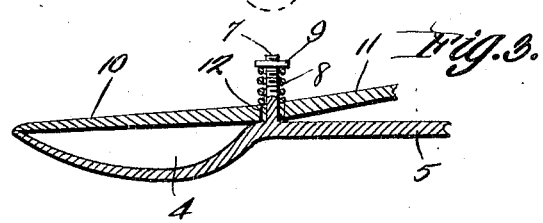
ROBERT B. RHYNE
INVENTOR.
BY
Richard B. Owen
ATTORNEY.
WITNESSES Patented Nov. 20, 1923.

1,474,443

UNITED STATES PATENT OFFICE.

ROBERT B. RHYNE, OF CAPE GIRARDEAU, MISSOURI.

SPOON.

Application filed June 24, 1921. Serial No. 480,115.

*To all whom it may concern:*

Be it known that I, ROBERT B. RHYNE, a citizen of the United States, residing at Cape Girardeau, in the county of Cape Girardeau and State of Missouri, have invented certain new and useful Improvements in Spoons, of which the following is a specification.

This invention relates to new and useful improvements in spoons, and more particularly to that type known as medicine spoons, the objects of the invention being to provide a spoon in which medicine may be accurately measured and administered to the patient from any angle without liability of the medicine spilling.

Another important object of the invention is to provide a spoon of this nature which includes a cover therefor having a handle disposed in a particular manner whereby simple and inexpensive means may be provided for connecting the cover to the spoon which will permit the former to move both laterally and upwardly of the bowl of the spoon.

Other objects and advantages of the invention will become apparent during the course of the following description.

In the accompanying drawing forming a part of the application and wherein like numerals are employed to designate like parts throughout the several views, Figure 1 is a side elevation of the invention, Figure 2 is a plan thereof, and Figure 3 is a longitudinal section through a part of the device.

Referring now more particularly to the drawing wherein for the purpose of illustration is shown the preferred embodiment of my invention, the numeral 4 designates the bowl of a spoon having a handle 5 extending therefrom in the well known manner. The upper surface of the handle 5 from the bowl of the spoon to a point adjacent the free end of the handle, is cut away as at 6 for the purpose which will hereinafter appear. At the juncture of the bowl 4 and handle 5 the spoon is provided with an outstanding stud 7, the free end of which is screw threaded as seen in Figure 3 and adapted to receive thereon a coiled spring 8 and a nut 9, the nut forming an abutment for one end of the coiled spring.

The cover for the bowl of the spoon is indicated by the numeral 10 and its outline is adapted to coincide with that of the bowl of the spoon when the cover is arranged in a closed position. It will be also appreciated that this cover is adapted to fit snugly against the edge of the bowl so as to preclude the escape of medicine therefrom. The cover 10 is provided with an extension 11 forming a handle for the cover, and it is to be particularly noted that this handle 11 extends at an angle from the cover 10. The angular juncture of the cover and its handle is provided with an aperture 12 which is slightly larger in diameter than that of the stud 7. The stud projects through this aperture whereby the angular juncture of the bowl and its handle will engage the juncture of the bowl and handle of the spoon in order to form a fulcrum for the cover.

The coiled spring 8 is received upon the stud 7 above the cover 10 so that one end of the coiled spring bears against the cover to normally maintain the same in snug engagement with the edge of the bowl while the handle of the cover is normally retained in spaced relation to the handle of the spoon. As explained before, the other end of the coiled spring 8 engages the abutment 9 and consequently always exerts a downward pressure upon the angular fulcrum portion of the cover to retain the latter in snug engagement with the spoon proper.

From the foregoing description, it will be obvious that the cover may be swung laterally of the bowl, it pivoting upon the stud 7. Consequently, the bowl of the spoon may be filled with medicine either in liquid form or otherwise, after which the cover 10 is caused to pivot back toward the bowl of the spoon and in so doing remove all surplus material thereby making it possible to accurately measure out a level teaspoonful. After the cover has been returned to its normal position its edges will coincide with those of the bowl of the spoon and it will therefore be obvious that inasmuch as a tight fit exists between the cover and the bowl, the medicine may be administered to a patient lying upon his back without any of the medicine spilling from the spoon. After the bowl of the spoon has been inserted into the patient's mouth, the handle 11 of the cover is depressed thereby causing the cover to fulcrum at the angular juncture thereby causing the cover to open and the medicine to run from the bowl of the spoon.

The foregoing description and accompanying drawings have reference to what might be considered to be the approved or preferred form of my invention. I desire it to be understood that I may make such changes in the construction, combination and arrangement of parts material, dimensions, etc., as may prove expedient and fall within the scope of the appended claims.

Having thus described my invention what I claim as new and desire to secure by Letters Patent is:

1. In a medicine spoon, the combination with a bowl portion and a handle therefor; of a cover for the bowl thereof and having an angularly disposed handle, the angular juncture of the cover and its handle being engaged with the handle of the spoon to form a fulcrum, and said handle of the cover being arranged in spaced relation to the spoon handle and adapted to be moved toward the spoon handle to cause said angular juncture to fulcrum and move the cover away from the bowl of the spoon.

2. The combination with a spoon having a bowl and handle therefor, a stud rising from the spoon adjacent the bowl thereof; of a cover for the bowl having an opening through which said stud projects whereby the cover is capable of pivoting both laterally and vertically of the bowl, said cover having an angularly disposed extension forming a handle which is normally spaced from the handle of the spoon, said cover at its juncture with its handle being engaged with the spoon to form a fulcrum, and a coiled spring on said stud for normally retaining the cover in a closed position.

3. In a medicine spoon, the combination with a bowl portion and handle therefor; of a cover for the bowl having an angularly disposed handle, the angular juncture of the handle being engaged with the handle of the spoon to form a fulcrum for the cover of the bowl to move vertically of the bowl, and said cover handle being pivotally mounted on the spoon handle to move laterally of the medicine spoon.

4. The combination with a spoon having a bowl and a handle therefor, a stud rising from the handle adjacent the said bowl; of a cover for the bowl having an opening through which said stud projects whereby the cover is movable both vertically and laterally of the bowl, said cover having an angularly disposed extension forming a handle which is normally spaced from the handle of the spoon, said cover at its juncture with its handle being engaged with the spoon to form a fulcrum, an abutment on the stud, and a coiled spring on said stud engaging said abutment and the cover for normally retaining the latter in a closed position.

5. In a medicine spoon, the combination with a bowl portion and a handle therefor; a stud carried by said handle adjacent the bowl portion; of a cover for the bowl portion and having an angularly disposed handle, the angular juncture of the cover and its handle being fulcrumed on the spoon handle and having an opening which receives the said stud for pivotally mounting the cover, and said stud being smaller in diameter than the said opening to permit the cover and its handle to rock upon their fulcrum.

In testimony whereof I affix my signature in presence of two witnesses.

ROBERT B. RHYNE.

Witnesses:
 ALBERT KEMPE,
 WM. F. OBERHEIDE.